(12) United States Patent
Kobayashi

(10) Patent No.: US 8,444,331 B2
(45) Date of Patent: May 21, 2013

(54) CAMERA MODULE

(75) Inventor: Masaru Kobayashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 89 days.

(21) Appl. No.: 13/167,204

(22) Filed: Jun. 23, 2011

(65) Prior Publication Data

US 2012/0057858 A1 Mar. 8, 2012

(30) Foreign Application Priority Data

Sep. 8, 2010 (JP) ................................. 2010-200893

(51) Int. Cl.
*G03B 17/48* (2006.01)
*H01L 31/0203* (2006.01)

(52) U.S. Cl.
USPC .......................................... 396/439; 257/433

(58) Field of Classification Search
USPC ................................................. 396/106, 439
See application file for complete search history.

(56) References Cited

U.S. PATENT DOCUMENTS

| 8,217,482 B2 * | 7/2012 | Basoor et al. ................. 257/436 |
| 2008/0067330 A1 * | 3/2008 | Yamamoto .................... 250/226 |
| 2011/0019048 A1 * | 1/2011 | Raynor et al. ................ 348/302 |
| 2011/0019077 A1 | 1/2011 | Kobayashi et al. |

FOREIGN PATENT DOCUMENTS

| JP | 2009-3281 A | 1/2009 |
| JP | 2010-11198 | 1/2010 |
| JP | 2010-187184 A | 8/2010 |

OTHER PUBLICATIONS

Office Action issued Nov. 20, 2012 in Japanese Patent Application No. 2010-200893 with English language translation.

* cited by examiner

*Primary Examiner* — Clayton E Laballe
*Assistant Examiner* — Noam Reisner
(74) *Attorney, Agent, or Firm* — Oblon, Spivak, McClelland, Maier & Neustadt, L.L.P.

(57) ABSTRACT

Certain embodiments provide a camera module comprising a sensor substrate, a lens holder, a lens, and an infrared light cut filter unit. The sensor substrate has a solid-state imaging device and a light receiving unit receiving infrared light. The lens holder is mounted on the sensor substrate so as to cover the solid-state imaging device and the light receiving unit. The lens is arranged in the lens holder. The infrared light cut filter unit is arranged in the lens holder.

17 Claims, 5 Drawing Sheets ized with respect to the focal position of the lens 14. The focal position of the lens 14 can be matched with the solid-state imaging device 12.

CAMERA MODULE

CROSS REFERENCE TO RELATED APPLICATIONS

This application is based upon and claims the benefit of priority from the prior Japanese Patent Application No. 2010-200893 filed in Japan on Sep. 8, 2010; the entire contents of which are incorporated herein by reference.

FIELD

Embodiments described herein relate generally to a camera module.

BACKGROUND

In general, a camera module includes a substrate on which a solid-state imaging device is mounted and a lens holder mounted on the substrate and having optical members such as a lens and the like therein.

In recent years, there are electronic devices having the above camera module to achieve an imaging function and having applications for achieving various kinds of functions. The electronic device has a touch panel and achieves the above functions including the image capturing function by operating the touch panel. Such an electronic device has a proximity sensor to detect a distance from the electronic device to an object in order to suppress malfunction of the applications.

However, since the conventional electronic device has the camera module and the proximity sensor as separate components, it is necessary to mount both of them to the electronic device. Therefore, there is a problem in that the size of the electronic device may increase.

DETAILED DESCRIPTION

A camera module according to one of the embodiments invention includes a sensor substrate, a lens holder, a lens, and an infrared light cut filter unit. The sensor substrate has a solid-state imaging device and a light receiving unit for receiving infrared light. The lens holder is mounted on the sensor substrate, and covers the solid-state imaging device and the light receiving unit. The lens is arranged within the lens holder. The infrared light cut filter unit is arranged in the lens holder.

The camera module according to the embodiments will be hereinafter explained in detail with reference to the drawings.

First Embodiment

Figure 1:
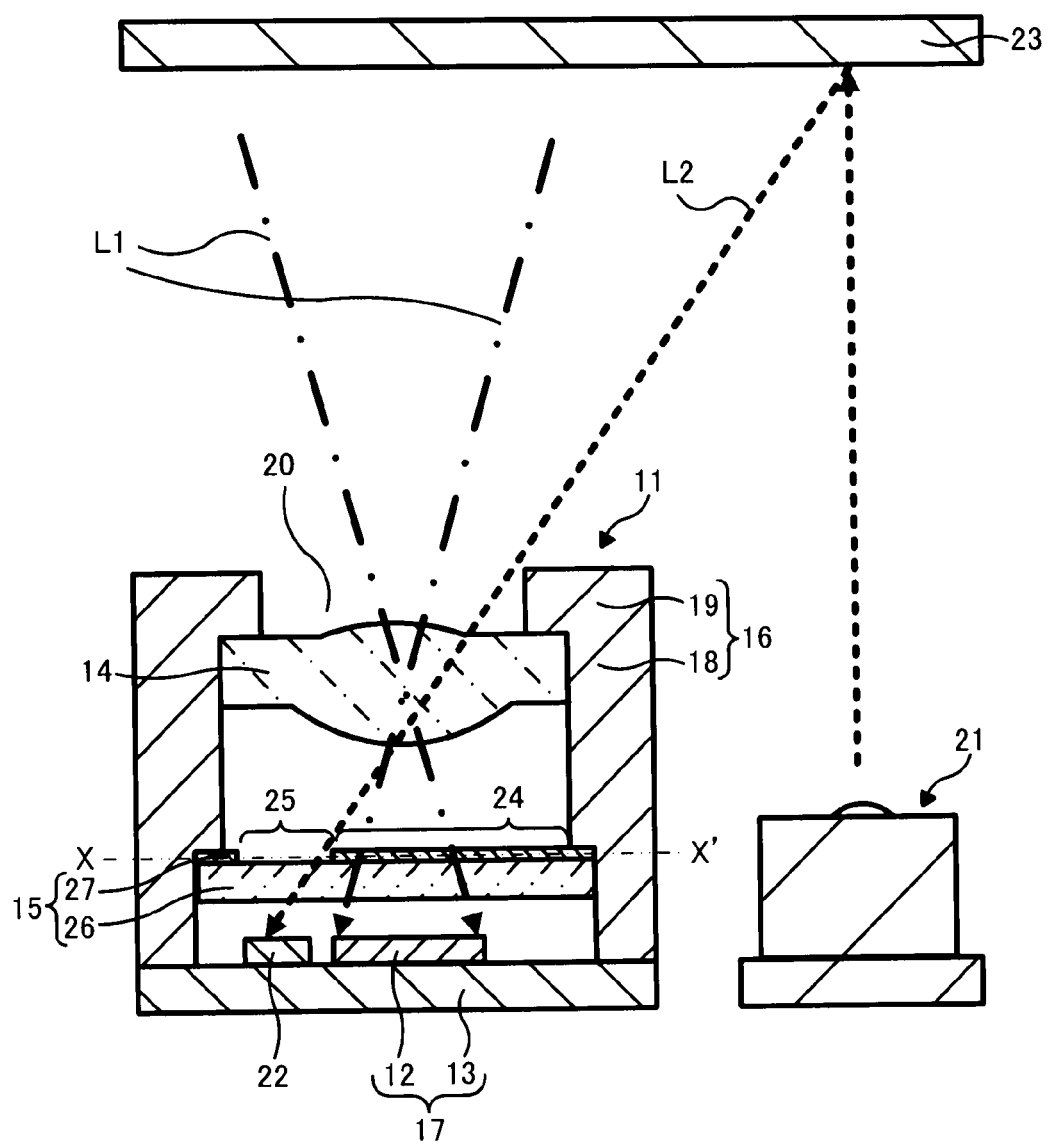
FIG. 1 is a vertical sectional view schematically illustrating a camera module and a light source for a proximity sensor according to a first embodiment.

FIG. 1 is a vertical sectional view schematically illustrating the camera module according to the first embodiment and a light source for a proximity sensor. As shown in FIG. 1, a camera module 11 according to the first embodiment includes a substrate 13 having a solid-state imaging device 12 mounted on the surface thereof and a lens holder 16 mounted on the surface of the substrate 13 and having the lens 14 and an infrared light cut filter unit 15 therein.

The solid-state imaging device 12 is formed by arranging a plurality of pixels made of, for example, photodiodes and microlens, arranged in a matrix form, and the solid-state imaging device is, for example, a CCD (Charge Coupled Device) sensor or a CMOS (Complementary Metal Oxide Semiconductor) sensor.

The substrate 13 having the solid-state imaging device 12 mounted thereon is, for example, a printed circuit board. In the explanation below, the substrate 13 including the solid-state imaging device 12 and having the solid-state imaging device 12 mounted thereon will be referred to as a sensor substrate 17.

The lens holder 16 is mounted on the surface of the sensor substrate 17. The lens holder 16 has a tubular portion 18 in a tube form both ends of which are open, and also includes a top plate 19 arranged at one of the open ends of the tubular portion 18. An opening portion 20 is provided at a substantially central portion of the top plate 19 so as to allow light to enter the lens holder 16.

In the lens holder 16, the lens 14 and the infrared light cut filter unit 15 are provided. The lens 14 is in contact with the inner wall of the tubular portion 18 and the top plate 19. Light L1 is reflected by an object to be captured and enters through the opening portion 20 of the top plate 19 (hereinafter referred to as image capturing light L1), and the lens 14 condenses light L1 onto the solid-state imaging device 12.

The infrared light cut filter unit 15 is provided at a position below the lens 14 and away from the lens 14 in the tubular portion 18. The side surface of the infrared light cut filter unit 15 is in contact with the inner wall of the tubular portion 18. The infrared light cut filter unit 15 has a region (infrared light shield unit, explained later) for shielding infrared light component of the image capturing light L1 entering through the opening portion 20 of the top plate 19. By shielding the infrared light component, the captured image is suppressed from deterioration.

The lens holder 16 is arranged on the surface of the sensor substrate 17 so as to cover the solid-state imaging device 12. The lens holder 16 is mounted on the surface of the sensor substrate 17 with an adhesive agent (not shown) provided between the other opening end of the tubular portion 18 and the surface of the sensor substrate 17.

It should be noted that the lens holder 16 is mounted after its position is adjusted in the vertical direction so that the focal position of the lens 14 matches the solid-state imaging device 12. The position of the lens holder 16 in the vertical direction is adjusted by the thickness of the adhesive agent (not shown).

A proximity sensor is composed by a light source 21 for emitting infrared light L2 and a light receiving unit 22 for receiving the infrared light L2 emitted by the light source 21. The camera module 11 further includes the light receiving unit 22 therein.

The infrared light L2 is emitted from the light source 21, and is reflected by an object 23. The light receiving unit 22 of the proximity sensor receives the infrared light L2, and therefore the light receiving unit 22 can detect the distance from the camera module 11 to the object 23.

The shorter the distance from the camera module 11 to the object 23, the stronger the intensity of the infrared light L2 received by the light receiving unit 22. Accordingly, the light receiving unit 22 receives the infrared light L2, and detects the distance from the camera module 11 to the object 23 on the basis of intensity information about the infrared light L2 that is output in accordance with the amount of received light.

For example, if the camera module 11 and the proximity sensor are mounted on a cellular phone having a touch panel, the object 23 is, for example, the head of a person. In this case, the light receiving unit 22 of the proximity sensor receives the infrared light L2 reflected by the head of the person, thus detecting the distance from the camera module 11 to the head of the person.

It should be noted that the intensity information about the infrared light L2 that is output in accordance with the amount of received light is transmitted to, for example, a control unit provided in a cellular phone. Then, for example, the control unit controls ON/OFF of a power source of the touch panel on the basis of the received intensity information.

The light receiving unit 22 of the proximity sensor is mounted on the surface of the sensor substrate 17, and is covered with the lens holder 16. Therefore, the infrared light L2 is emitted from the light source 21, and is reflected by the object 23. Then, the infrared light L2 passes through the lens 14 and the infrared light cut filter unit 15, and reaches the light receiving unit 22. Therefore, the infrared light cut filter unit 15 has not only the region for shielding the infrared light component (infrared light shield unit, explained later) but also a region for allowing the infrared light L2 to pass through (infrared light non-shield unit, explained later). The infrared light cut filter unit 15 having the region for allowing the infrared light L2 to pass through will be explained.

As shown in FIG. 1, the infrared light cut filter unit 15 includes an infrared light shield unit 24 for shielding infrared light and an infrared light non-shield unit 25 for allowing infrared light to pass through. For example, the infrared light shield unit 24 is a region made by coating a surface of a transparent substrate 26 having optical transparency such as glass with an infrared light shielding film 27 for reflecting the infrared light. The infrared light shielding film 27 is made by laminating, for example, an SiO$_2$ film and a TiO$_2$ film, which are repeatedly laminated so that the overall thickness becomes about 1 μm.

Figure 2:
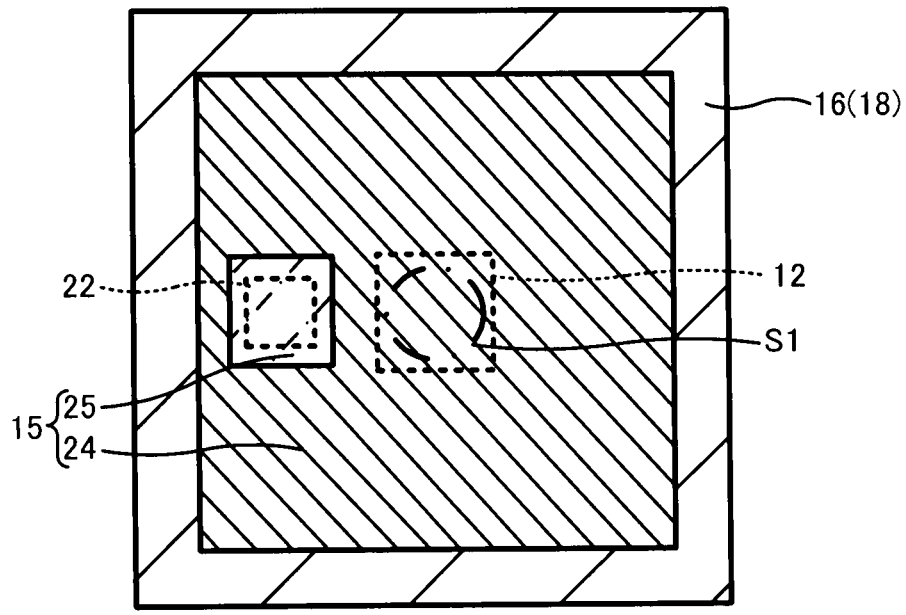
FIG. 2 is a horizontal sectional view of the camera module taken along a chain double-dashed line X-X' of FIG. 1.

The infrared light non-shield unit 25 is a region in which the infrared light shielding film is not formed on the surface of the transparent substrate 26. The infrared light non-shield unit 25 is formed at least above the light receiving unit 22 of the proximity sensor. The infrared light non-shield unit 25 will be hereinafter explained in detail with reference to FIG. 2. FIG. 2 is a horizontal sectional view of the camera module 11 taken along a chain double-dashed line X-X' of FIG. 1.

As shown in FIG. 2, the infrared light cut filter unit 15 is in a substantially quadrangular shape whose side surfaces are in contact with inner walls of the lens holder 16 in a substantially quadrangular shape. The infrared light non-shield unit 25 of the infrared light cut filter unit 15 is a quadrangular shaped region constituted by four sides, and is enclosed by the infrared light shield unit 24. The infrared light non-shield unit 25 is formed in a region including a portion above the light receiving unit 22 of the proximity sensor. However, the infrared light non-shield unit 25 is formed in a region except a region which allows the image capturing light L1 being condensed by the lens 14 onto the solid-state imaging device 12 to pass through (i.e., within a region indicated by an alternate long and short dashed line S1 in the figure). In view of a case where the infrared light L2 reflected by the object 23 is diagonally incident to the camera module 11, the area of the infrared light non-shield unit 25 is larger than at least the area of the light receiving unit 22 of the proximity sensor so that the diagonally incident infrared light L2 passes through the infrared light non-shield unit 25.

The infrared light non-shield unit 25 is made by forming the infrared light shielding film 27 on the entire surface of the transparent substrate 26 having optical transparency and thereafter removing the infrared light shielding film 27 at a desired position by patterning process.

The infrared light cut filter unit 15 preferably includes the infrared light shield unit 24 and the infrared light non-shield unit 25. However, in the present embodiment, the infrared light cut filter unit 15 does not necessarily need to have the infrared light non-shield unit 25.

It is difficult for the infrared light shield unit 24 of the infrared light cut filter unit 15 to reflect 100% of the emitted infrared light, and a very small amount of infrared light passes therethrough. Therefore, a light source 21 emitting infrared light L2 with an extremely high intensity may be employed as the light source 21 of the proximity sensor so that the infrared light L2 passing through the infrared light shield unit 24 reaches the light receiving unit 22 with an intensity high enough to allow detection of the distance. In this case, the infrared light cut filter unit 15 does not necessarily need to have the infrared light non-shield unit 25.

Alternatively, a light source 21 emitting light having a wavelength that is not shielded by the infrared light cut filter unit 15 (for example, a wavelength longer than 1000 μm) may be employed as the light source 21 of the proximity sensor. Even in this case, the infrared light cut filter unit 15 does not necessarily need to have the infrared light non-shield unit 25.

The camera module 11 according to the present embodiment explained above as well as the light source 21 of the proximity sensor are mounted on an electronic device such as a cellular phone. At this case, the light receiving unit 22 of the proximity sensor is mounted inside the camera module 11. Therefore, a space for mounting the camera module 11 and the light source 21 of the proximity sensor is sufficient as the space in the electronic device mounting the camera module 11 and the proximity sensor, in which case a space for mounting the light receiving unit 22 of the proximity sensor is not necessary. Therefore, the camera module 11 which can downsize the electronic device can be provided.

Second Embodiment

Figure 3:
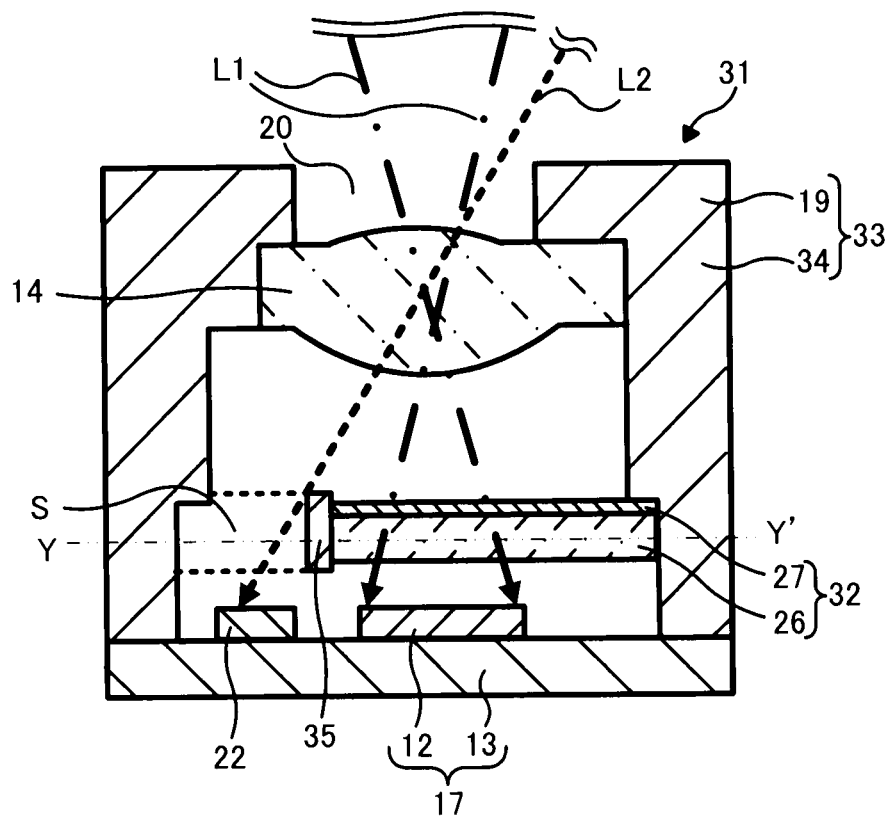
FIG. 3 is a vertical sectional view schematically illustrating a camera module according to a second embodiment.

FIG. 3 is a vertical sectional view schematically illustrating a camera module according to a second embodiment. When a camera module 31 shown in FIG. 3 is compared with the camera module 11 shown in FIG. 1, an infrared light cut filter unit 32 and the internal structure of a tubular portion 34 of a lens holder 33 are different. Although omitted in FIG. 3, a light source 21 of a proximity sensor is arranged in proximity to the camera module 31 like FIG. 1.

As shown in FIG. 3, in the camera module 31 according to the second embodiment, the infrared light cut filter unit 32 is formed so as not to cover a portion above the light receiving unit 22 of the proximity sensor. More specifically, a portion of a side surface of the infrared light cut filter unit 32 is formed to be away from the inner wall of the tubular portion 34 of the lens holder 33, and is formed to be in contact with a separating unit 35 of the lens holder 33 explained later.

Further, the lens holder 33 has the tubular portion 34 having the separating unit 35 formed therein. This separating unit 35 is arranged to prevent the side surface of the transparent substrate 26 of the infrared light cut filter unit 32 from being exposed in the lens holder 33.

If the separating unit 35 does not exist, the side surface of the transparent substrate 26 is exposed in the lens holder 33. If the side surface of the transparent substrate 26 is exposed in the lens holder 33, the image capturing light L1 is diffusely reflected in the exposed portion, and this causes flare in a captured image. Therefore, the captured image is deteriorated.

However, if the transparent substrate 26 of the infrared light cut filter unit 32 is arranged to be in contact with the lens holder 33 and the separating unit 35, the side surface of the transparent substrate 26 is not exposed in the lens holder 33, and therefore, this reduces diffused reflection of the image capturing light L1, and suppresses deterioration of the captured image.

It should be noted that the thickness of a portion of the tubular portion 34 of the lens holder 33 that is in contact with the lens 14 and is above the light receiving unit 22 is thicker than the other portion. This thick portion is formed to cover the upper side of the light receiving unit 22.

Figure 4:
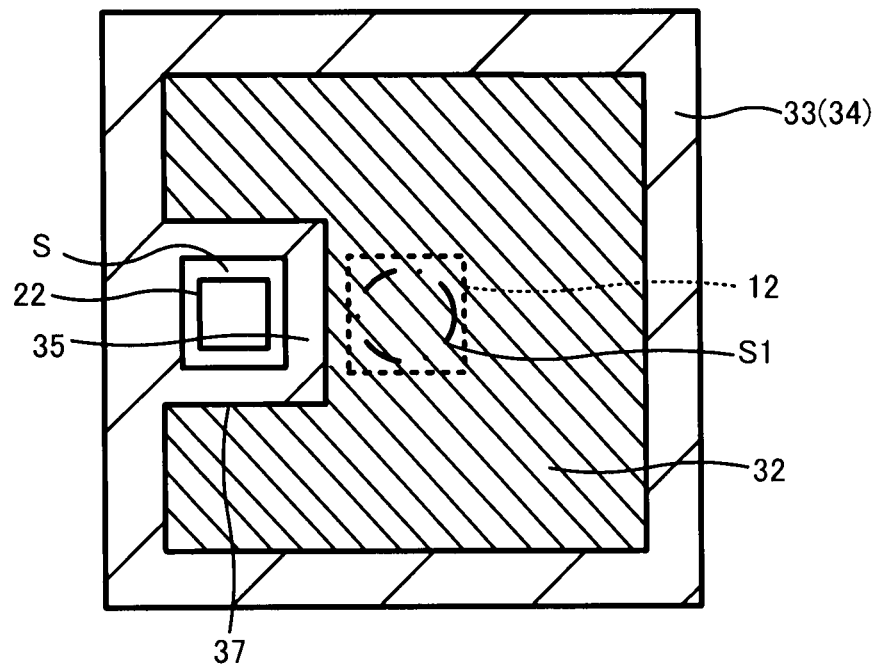
FIG. 4 is a horizontal sectional view of the camera module taken along a chain double-dashed line Y-Y' of FIG. 3.

The lens holder 33 and the infrared light cut filter unit 32 will be hereinafter explained in detail with reference to FIG. 4. FIG. 4 is a horizontal sectional view of the camera module 31 taken along a chain double-dashed line Y-Y' of FIG. 3.

As shown in FIG. 4, the infrared light cut filter unit 32 is in a substantially quadrangular shape having a recessed portion 37 at a portion above the light receiving unit 22 of the proximity sensor. The side surface of the infrared light cut filter unit 32 except the recessed portion 37 is in contact with the inner wall of the tubular portion 34 of the lens holder 33. The recessed portion 37 is in contact with the separating unit 35 of the lens holder 33.

The lens holder 33 has the tubular portion in the substantially quadrangular shape having the separating unit 35 therein. The separating unit 35 is in a C-shape and is in contact with the inner wall of the tubular portion 34. The separating unit 35 is formed such that a space S surrounded by the separating unit 35 and a portion of the tubular portion 34 is located above the light receiving unit 22 of the proximity sensor.

The space S surrounded by the separating unit 35 and the portion of the tubular portion 34 is configured to allow the infrared light L2 reflected by the object to pass through and to allow the infrared light L2 to reach the light receiving unit 22 of the proximity sensor. Therefore, in view of a case where the infrared light L2 is diagonally incident on the camera module 31, the area of the space S is larger than at least the area of the opening of the light receiving unit 22 of the proximity sensor so that the incident infrared light L2 passes through the space S. However, the space S is not arranged in a region through which the image capturing light L1 passes (within a region indicated by an alternate long and short dashed line S1 of the figure) so that the image capturing light L1 reaching the solid-state imaging device 12 does not pass through the space S.

In the camera module 31 according to the second embodiment, the image capturing L1 passes through the infrared light cut filter unit 32, and therefore, the infrared light component of the image capturing light L1 is shielded. However, the infrared light L2 is emitted from the light source 21 and is reflected by the object 23, and then the infrared light L2 passes through the space S enclosed by the separating unit 35 and the portion of the tubular portion 34 and reaches the light receiving unit 22.

It should be noted that the camera module 31 according to the present embodiment does not necessarily need to have the separating unit 35. Even if the separating unit 35 is not formed, the infrared light L2 passes through the space S enclosed by the recessed portion 37 of the infrared light cut filter unit 32 and the inner wall of the tubular portion 34 of the lens holder 33, and the infrared light L2 can reach the light receiving unit 22 of the proximity sensor. However, the transparent substrate 26 is exposed in the lens holder 33 from the side surface constituting the recessed portion 37 of the infrared light cut filter unit 32. Therefore, if the image capturing light L1 is emitted onto the exposed transparent substrate 26, the image capturing light L1 is diffusely reflected. If the image capturing light L1 is diffusely reflected, this causes flare in a captured image, and the captured image is deteriorated. Therefore, in order to reduce deterioration of the image, it is preferable to form the separating unit 35.

In other words, the infrared light cut filter unit according to the present embodiment may be interpreted as including the infrared light shield unit constituted by the entire infrared light cut filter unit 32 having the recessed portion 37 and the infrared light non-shield unit constituted by the space S enclosed by the recessed portion 37 and the inner wall of the lens holder 33.

Like the camera module 11 shown in FIG. 1, the camera module 31 according to the second embodiment explained above has the light receiving unit 22 of the proximity sensor mounted on the camera module 31. Therefore, the space for mounting the camera module 31 and the light source 21 of the proximity sensor is sufficient as the space in the electronic device mounting the camera module 31 and the proximity sensor. Therefore, the camera module 31 which can downsize the electronic device can be provided.

Further, in the camera module 31 according to the second embodiment, the infrared light cut filter unit 32 has the recessed portion 37 for allowing the infrared light L2 to pass through. Therefore, in the camera module 31 according to the second embodiment, the light source 21 consumes less power than the camera module 11 according to the first embodiment.

In other words, the infrared light non-shield unit 25 shown in FIG. 2 is a region for allowing almost 100% of the infrared light L2 to pass through. However, the intensity of the infrared light L2 is attenuated if it passes through the infrared light non-shield unit 25. In contrast, in the camera module 31 according to the second embodiment, the region for allowing the infrared light L2 to pass through is the space S. Therefore, the infrared light L2 passes through the space S without any attenuation in its intensity. Therefore, the intensity of the infrared light L2 emitted from the light source 21 in the camera module according to the second embodiment is set at a value less than that in the camera module 11 according to the first embodiment. Therefore, the power consumption of the light source 21 can be reduced.

Third Embodiment

Figure 5:
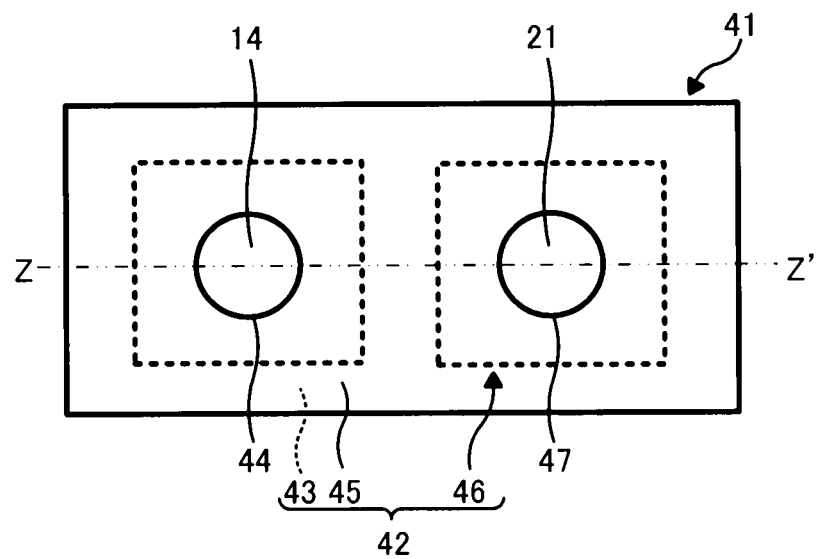
FIG. 5 is a top view schematically illustrating a camera module according to a third embodiment.
Figure 6:
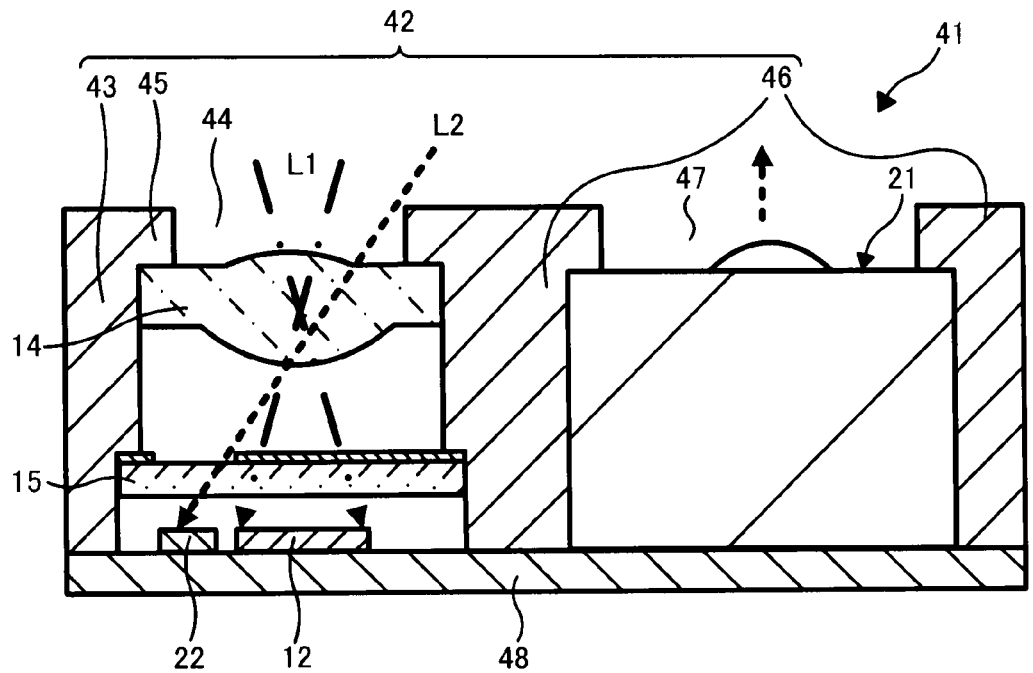
FIG. 6 is a vertical sectional view of the camera module taken along a chain double-dashed line Z-Z' of FIG. 5.

FIG. 5 is a top view schematically illustrating a camera module according to the third embodiment. FIG. 6 is a schematic sectional view of the camera module taken along a chain double-dashed line Z-Z' of FIG. 5. When a camera module 41 shown in FIGS. 5 and 6 is compared with the camera module 11 shown in FIG. 1, the shape of a lens holder 42 is different.

As shown in FIGS. 5 and 6, the lens holder 42 has a tubular portion 43 including a lens 14 and an infrared light cut filter unit 15 therein, a top plate 45 provided on an end of the tubular portion 43 and having an opening portion 44 at a substantially central portion thereof, and a light source housing unit 46 arranged on an outer wall of the tubular portion 43 and capable of accommodating a light source 21 of a proximity sensor therein.

As shown in FIG. 5, the lens holder 42 has not only the opening portion 44 in the top plate 45 but also an opening portion 47 in the light source housing unit 46. The opening portion 44 in the top plate 45 has the same configuration as the opening portion 20 in the top plate 19 of the lens holder 16 shown in FIG. 1, and a portion of the lens 14 is exposed therethrough. If the light source 21 is accommodated in the light source housing unit 46, a portion of the light source 21 is exposed through the opening portion 47 provided in the light source housing unit 46.

The camera module 41 according to the third embodiment having the above lens holder 42 will be hereinafter explained in detail with reference to FIG. 6. As shown in FIG. 6, in the camera module 41 according to the third embodiment, a solid-state imaging device 12 and a light receiving unit 22 of the proximity sensor are mounted on the surface of a substrate 48. Further, the light source 21 of the proximity sensor is mounted on the surface of the substrate 48 at a position away from the solid-state imaging device 12.

On the surface of the substrate 48, the lens holder 42 is mounted. The lens holder 42 is mounted on the surface of the substrate 48 such that the tubular portion 43 covers the solid-state imaging device 12 and the light receiving unit 22 of the proximity sensor, and the light source housing unit 46 covers the light source 21 of the proximity sensor.

For example, like the camera module 11 according to the first embodiment, the lens 14 and the infrared light cut filter unit 15 are respectively formed within the tubular portion 43. However, the infrared light cut filter unit 15 arranged in the tubular portion 43 may be the infrared light cut filter unit 32 of the camera module 31 according to the second embodiment. In this case, it is preferable to form the separating unit 35 in the tubular portion 43 of the lens holder 42.

The camera module 41 according to the third embodiment as described above is produced by, for example, arranging the solid-state imaging device 12, the light receiving unit 22 of the proximity sensor, and the light source 21 of the proximity sensor at predetermined positions on the surface of the substrate 48 and mounting the lens holder 42 on the surface of the substrate 48 so as to cover them.

Like the camera module 11 shown in FIG. 1, the camera module 41 according to the third embodiment explained above does not require a space for mounting the light receiving unit 22 of the proximity sensor. Therefore, the camera module 41 which can downsize the electronic device can be provided.

Further, the camera module 41 according to the third embodiment is integrally formed with the light source 21 of the proximity sensor. Therefore, it is not necessary to mount the light source 21 to the electronic device in a step different from the step for mounting the camera module 41, and the light source 21 is mounted at the same time as the camera module 41 is mounted to the electronic device. Therefore, the camera module 41 according to the third embodiment can be mounted to the electronic device with a fewer steps than the camera modules 11, 31 according to the first and second embodiments.

Further, the camera module 41 according to the third embodiment is integrally formed with the light source 21 of the proximity sensor. Therefore, if the camera module 41 is mounted onto the electronic device, the camera module 41 reduces variation in the position of the light source 21 of the proximity sensor with respect to the light receiving unit 22 of the proximity sensor. Therefore, in the camera module 41 according to the third embodiment, the proximity sensor can improve the distance detection accuracy as compared with the camera modules 11, 31 according to the first and second embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the infrared light non-shield unit 25 of the infrared light cut filter unit 15 applied to the camera module 11 according to the first embodiment is formed only above the light receiving unit 22 of the proximity sensor as shown in FIG. 2. However, the infrared light non-shield unit 25 of the infrared light cut filter unit 15 only need to be formed so as not to shield the infrared light L2 reflected by the object 23. Therefore, for example, the infrared light cut filter unit 15 may have a structure shown in FIG. 7 below.

Figure 7:
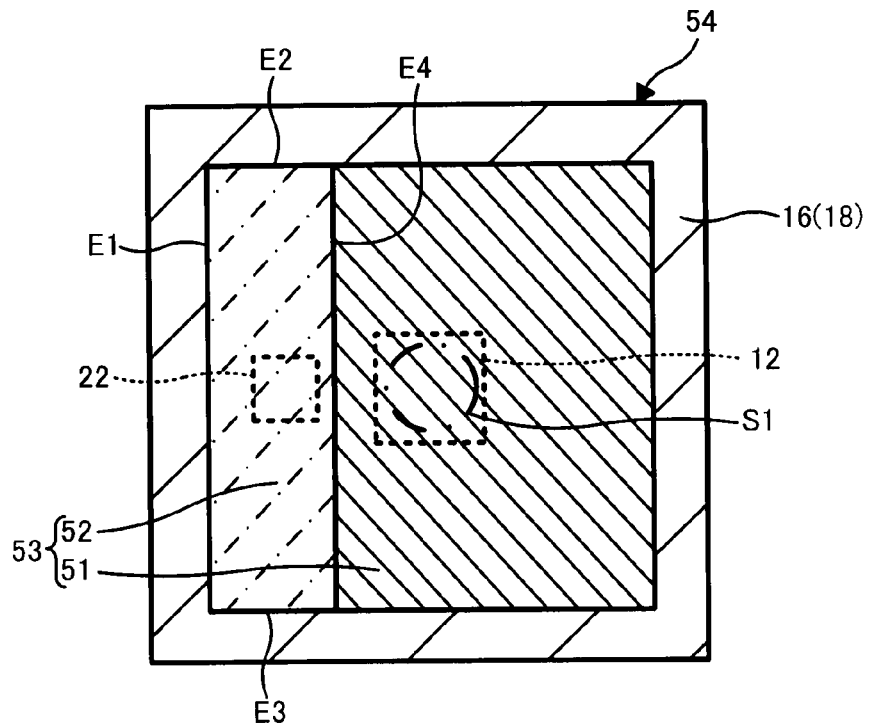
FIG. 7 is a horizontal sectional view corresponding to FIG. 2 and illustrating a camera module according to the first embodiment having another example of an infrared light cut filter unit including an infrared light shield unit and an infrared light non-shield unit.

FIG. 7 is a horizontal sectional view corresponding to FIG. 2 and illustrating a camera module 54 according to the first embodiment having another example of an infrared light cut filter unit 53 including an infrared light shield unit 51 and an infrared light non-shield unit 52. As shown in FIG. 7, the infrared light non-shield unit 52 of the infrared light cut filter unit 53 may be a region in a substantially quadrangular shape enclosed by four sides E1, E2, E3, E4, and it may be formed such that the three sides E1, E2, E3 are in contact with the inner wall of the lens holder 16, and the other side E4 is away from the inner wall of the lens holder 16. The infrared light non-shield unit 52 is formed such that the side E4 is between the solid-state imaging device 12 and the light receiving unit 22 of the proximity sensor. For example, the infrared light cut filter unit 53 may have the structure as shown in FIG. 7.

The infrared light cut filter unit 53 is made by forming an infrared light shielding film in a predetermined region of the surface of the transparent substrate 26. Therefore, it is not necessary to remove the infrared light shielding film 27 by patterning process. Therefore, it can be produced more easily than the infrared light cut filter unit 15 as shown in FIG. 2.

Further, the lens holder 33 applied to the camera module 31 according to the second embodiment has the separating unit 35 in a C-shape on a portion of the side wall thereof as shown in FIG. 4. However, the lens holder 33 applied to the camera module 31 may be formed so as not to shield the infrared light L2 reflected by the object 23. Therefore, for example, the lens holder 33 may have a structure shown in FIG. 8 below.

Figure 8:
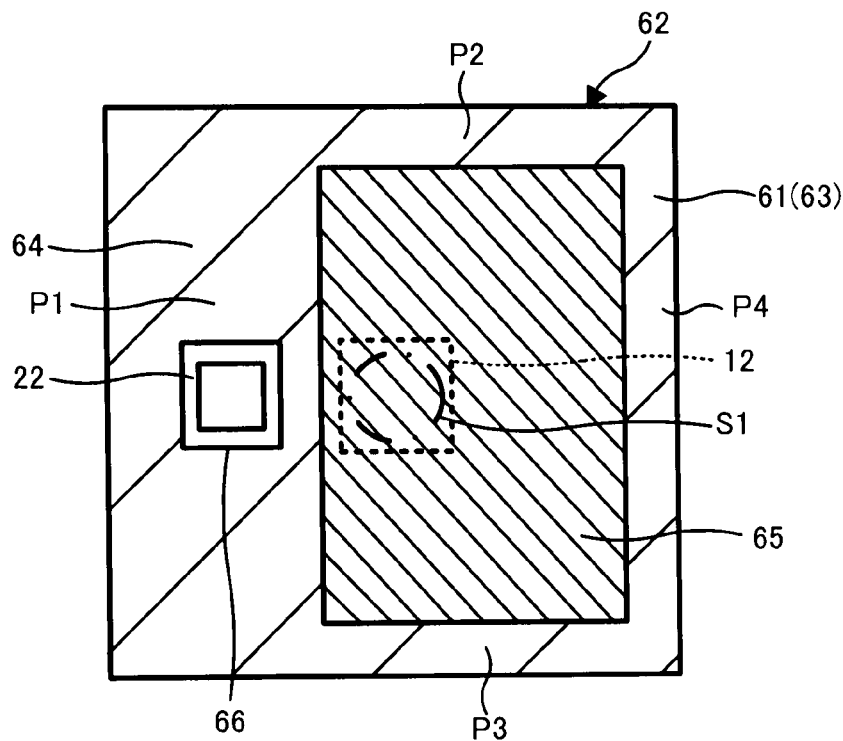
FIG. 8 is a horizontal sectional view corresponding to FIG. 4 and illustrating another example of a lens holder of the camera module according to the second embodiment.

FIG. 8 is a horizontal sectional view corresponding to FIG. 4 and illustrating a camera module 62 according to the second embodiment having another example of a lens holder 61. As shown in FIG. 8, a tubular portion 63 of a lens holder 61 is constituted by four flat surfaces P1, P2, P3, P4. In some portion of the flat surface P1, a thick portion 64 is formed to have a thickness thicker than those of the other three flat surfaces P2, P3, P4. The thick portion 64 is arranged at a position in contact with the infrared light cut filter unit 65 so that it is formed to cover the side surface of the infrared light cut filter unit 65. Further, the thick portion 64 is formed to extend inward direction of the lens holder 61 so as to cover the upper side of the light receiving unit 22 of the proximity sensor.

In the thick portion 64, an opening portion is formed at a position corresponding to the light receiving unit 22 of the proximity sensor. The infrared light L2 reflected by the object 23 passes through the opening portion 66. Therefore, in view of a case where the infrared light L2 is diagonally incident to the camera module, the opening portion 66 is formed to have an aperture size so as to allow even the diagonally incident infrared light L2 to pass through. In other words, the separating unit is constituted by the thick portion 64 having the opening portion 66 formed therein. For example, the lens holder 61 may have a structure as shown in FIG. 8.

In other words, in the modification shown in FIG. 8, the infrared light cut filter unit may be interpreted as including the infrared light shield unit constituted by the entire infrared light cut filter unit 65 shown in FIG. 8 and the infrared light non-shield unit made of the opening portion 66 formed in the thick portion 64.

For example, the light receiving unit 22 of the proximity sensor may be an area sensor 71. If the light receiving unit 22 is the area sensor 71, the proximity sensor can improve the distance detection accuracy. This reason will be hereinafter explained with reference to FIG. 9.

Figure 9:
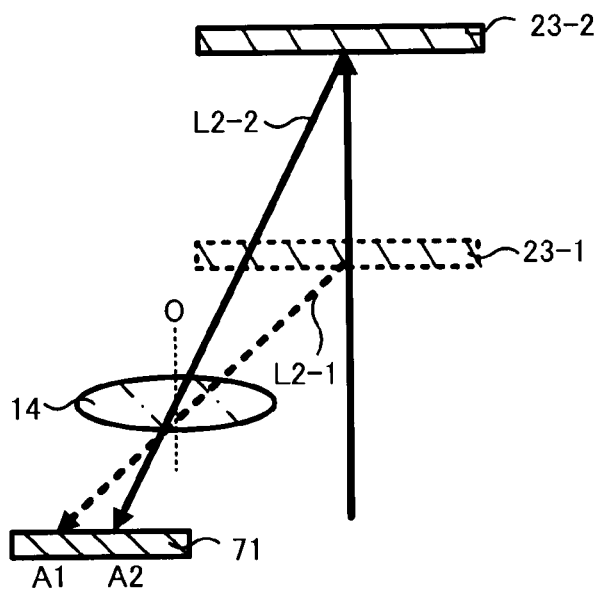
FIG. 9 is an explanatory diagram for explaining a reason why the distance detection accuracy is improved by making a proximity sensor light receiving unit into an area sensor.

FIG. 9 is an explanatory diagram for explaining a reason why the distance detection accuracy is improved by making the light receiving unit 22 of the proximity sensor into an area sensor 71. As shown in FIG. 9, if an object 23-2 is located away from the camera module, a reflected light L2-2 of the infrared light reflected by the object 23-2 returns back to a position A2 at a side of a center O of the lens 14 on the area sensor 71 due to the effect of the lens 14.

On the other hand, if an object 23-1 is located close to the camera module, a reflected light L2-1 of the infrared light reflected by the object 23-1 returns back to a position A1 at an outer side of the lens 14 on the area sensor 71 due to the effect of the lens 14.

Due to the effect of the lens 14 as explained above, the area sensor 71 uses position information indicating positions (A1, A2) at which the reflected lights L2-1, L2-2 are received and intensity information about the reflected lights L2-1, L2-2 to calculate distances to the objects 23-1, 23-2. Therefore, if the light receiving unit 22 of the proximity sensor is the area sensor 71, the distance detection accuracy can be improved.

In contrast, the light receiving unit 22 of the proximity sensor detects the distances to the objects 23-1, 23-2 using only the intensity information about the reflected lights L2-1, L2-2. Therefore, if the light receiving unit 22 detects the distances, the detected distances include large errors due to the states of the objects 23-1, 23-2 (for example, difference of flesh color).

The camera module having the light receiving unit 22 of the proximity sensor mounted thereon is not limited to the camera modules according to the embodiments explained above and may have any structure as long as the image capturing light L1 reaches the solid-state imaging device 12 without being shielded and the infrared light L2 reflected by the object 23 reaches the light receiving unit 22 without being shielded. Therefore, for example, the structure of the sensor substrate 17 is not limited to the substrate 13 having the solid-state imaging device 12 mounted thereon. For example, a sensor substrate having the solid-state imaging device 12 mounted between the substrate 13 and a glass substrate fixed onto the substrate 13 may also be employed.

What is claimed is:

1. A camera module comprising:
    a sensor substrate including a solid-state imaging device and a light receiving unit for receiving an infrared light that are arranged at positions spaced from each other;
    a cylindrical lens holder mounted on the sensor substrate and covering the solid-state imaging device and the light receiving unit;
    a lens being in contact with an inner wall of the lens holder, the lens focusing the image capturing light to the solid-state imaging device and also focusing the infrared light to the light receiving unit; and
    an infrared light cut filter unit including an infrared light shield unit and an infrared light non-shield unit, the infrared light cut filter unit is arranged in the lens holder so that the infrared light non-shield unit is arranged above the light receiving unit.

2. The camera module according to claim 1, wherein the infrared light non-shield unit is a region in a quadrangular shape including four sides, and
    the infrared light non-shield unit is surrounded by the infrared light shield unit.

3. The camera module according to claim 1, wherein the infrared light non-shield unit is a region in a quadrangular shape including four sides,
    three sides of the four sides are in contact with the lens holder, and
    the another one side is disposed between the solid-state imaging device and the light receiving unit.

4. The camera module according to claim 1, wherein the infrared light cut filter unit includes a transparent substrate having optical transparency and an infrared light shielding film formed on a surface of the transparent substrate, and
    the infrared light shielding film is arranged only in the infrared light shield unit.

5. The camera module according to claim 4, wherein the infrared light shielding film is a film made by repeatedly laminating an $SiO_2$ film and a $TiO_2$ film.

6. The camera module according to claim 1, wherein the light receiving unit is a light receiving unit of a proximity sensor.

7. The camera module according to claim 1, wherein the light receiving unit is an area sensor.

8. The camera module according to claim 1, wherein the infrared light cut filter unit has a recessed portion at a position above the light receiving unit, the recessed portion being the infrared light non-shield unit.

9. The camera module according to claim 8, wherein the lens holder has a separating unit on the inner wall for forming a desired space between the lens holder and the inner wall, and
    the recessed portion of the infrared light cut filter unit is in contact with the separating unit.

10. The camera module according to claim 8, wherein the light receiving unit is a light receiving unit of a proximity sensor.

11. The camera module according to claim 8, wherein the light receiving unit is an area sensor.

12. The camera module according to claim 1, wherein the lens holder includes three flat surfaces and another flat surface having a thick portion thicker than those of these flat surfaces, and the thick portion has an opening portion above the light receiving unit.

13. The camera module according to claim 12, wherein the light receiving unit is a light receiving unit of a proximity sensor.

14. The camera module according to claim 12, wherein the light receiving unit is an area sensor.

15. The camera module according to claim 1, wherein the lens holder has a light source housing unit on the side surface, and the light source housing unit can accommodate therein the light source for emitting the infrared light.

16. The camera module according to claim 15, wherein a proximity sensor is composed by the light receiving unit and the light source.

17. The camera module according to claim 15, wherein the light receiving unit is an area sensor.

* * * * *